United States Patent
Southern et al.

[11] Patent Number: 6,062,252
[45] Date of Patent: May 16, 2000

[54] STABILIZER FOR GAS LINE METER

[76] Inventors: David J. Southern, 919 Nutter Blvd., Billings, Mont. 59105; Leslie H. Zuck, 3306 Jack Burke La., Billings, Mont. 59106-1112

[21] Appl. No.: 09/030,656

[22] Filed: Feb. 25, 1998

[51] Int. Cl.⁷ .................................................. F16L 5/00
[52] U.S. Cl. .................. 137/357; 137/356; 137/343; 137/316; 137/236.1; 248/548; 248/75
[58] Field of Search .................................... 137/343, 357, 137/356, 316, 236.1, 361; 248/75, 548

[56] References Cited

U.S. PATENT DOCUMENTS

| | | | |
|---|---|---|---|
| 713,974 | 11/1902 | Foreman | 137/356 |
| 1,607,463 | 11/1926 | Kent | 137/316 |
| 2,179,416 | 11/1939 | Malear | 137/361 |
| 2,234,360 | 3/1941 | Whitson | 248/548 |
| 2,761,286 | 9/1956 | Billue et al. | 248/548 |
| 3,375,856 | 4/1968 | Howard et al. | 137/236.1 |
| 4,174,822 | 11/1979 | Larsson | 248/75 |
| 4,905,939 | 3/1990 | Horn | 248/75 |
| 4,914,759 | 4/1990 | Goff | 248/75 |
| 4,998,693 | 3/1991 | Wiebe | 248/75 |
| 5,007,605 | 4/1991 | Horvath | 248/75 |
| 5,067,679 | 11/1991 | Courtney | 248/75 |
| 5,226,456 | 7/1993 | Semak | 248/75 |
| 5,269,565 | 12/1993 | Langner | 248/548 |
| 5,533,303 | 7/1996 | Harvey | 137/357 |
| 5,738,313 | 4/1998 | Rinke | 248/75 |
| 5,749,179 | 5/1998 | Bohacik | 248/75 |
| 5,909,861 | 6/1999 | Korson | 248/75 |

*Primary Examiner*—A. Michael Chambers
*Assistant Examiner*—Thomas L. McShane
*Attorney, Agent, or Firm*—Richard C. Conover

[57] ABSTRACT

An apparatus for preventing a gas meter from settling when fill dirt surrounding a plastic gas line settles with time including a rigid protective sleeve, positioned in surrounding relation to the plastic gas pipe line. A support rod is provided which has one end resting upon a footer of the building. The other end of the support rod is secured to an upper end of the protective sleeve. At the bottom of the protective sleeve, a break-away pipe support fixture is secured to the protective sleeve. The support fixture extends away from the protective sleeve and is positioned to releasably hold a looped slack portion of the plastic gas supply line before the supply line extends into the protective sleeve.

3 Claims, 4 Drawing Sheets

STABILIZER FOR GAS LINE METER

BACKGROUND OF THE INVENTION

This invention relates to a device for stabilizing a gas line meter connected to a gas line being led into a building and more specifically to a device that prevents the gas meter from settling as fill dirt surrounding the gas line settles.

When new buildings are built, dirt is removed to provide space for construction of a foundation or below ground floor. If gas is to be used in the building for heating, a gas line, taken from a feeder line, is installed across the space left by the removed dirt into a position adjacent to the foundation wall. An incoming gas supply line is usually made of plastic. Buildings codes generally require that any gas pipes above ground must be made of metal. A transition fitting is fitted to the end of the plastic gas supply line to provide a metal fitting having external threads. Conventional metal pipes can then be screwed to the external threads of the transition fitting. The gas line is then directed upwardly to gas meter above ground for easy access by a gas meter reader. The gas line runs from the meter to a gas line running into the building.

After the gas line is installed in the trench, the removed dirt is placed again in the space from which is was taken covering the gas line in the process. Problems develop when this fill dirt settles. The settling causes the gas line to settle with the dirt pulling the meter to which it is attached downwardly and away from the building. This presents an aesthetic as well as safety problems since the gas line and its connections are also disturbed.

It is an object of the present invention to provide apparatus for preventing a gas meter connected to a gas line from settling with the settling of the gas line.

SUMMARY OF INVENTION

The present invention relates to an apparatus for preventing a gas meter from settling when fill dirt surrounding the gas line settles with time.

A rigid protective sleeve, preferably constructed of metal, is slipped over the plastic gas pipe line immediately below the transition fitting and extends generally downwardly for a distance into the ground. A support rod is positioned having one end resting upon the footer of the building. The other end of the rod is positioned adjacent the top end of the protective sleeve. A fastener secures the rod to the protective sleeve so the protective sleeve can not drop as the fill dirt settles.

At the bottom of the protective sleeve, a break-away pipe support fixture is secured to the protective sleeve. The support fixture extends away from the protective sleeve and is positioned to releasably hold a looped portion of the plastic gas supply line before the supply line extends into the protective sleeve.

When fill dirt is placed over the apparatus of the present invention, the gas supply line is supported by the support fixture. As the back fill dirt settles, the support fixture breaks away from the gas supply line and the movement of the gas line is accommodated by the loop of gas line held by the support fixture. The protective sleeve is supported by the support rod resting on the footer and will not settle with the gas line. Thus the meter connected to the protective sleeve is protected from settling as well.

BRIEF DESCRIPTION OF DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
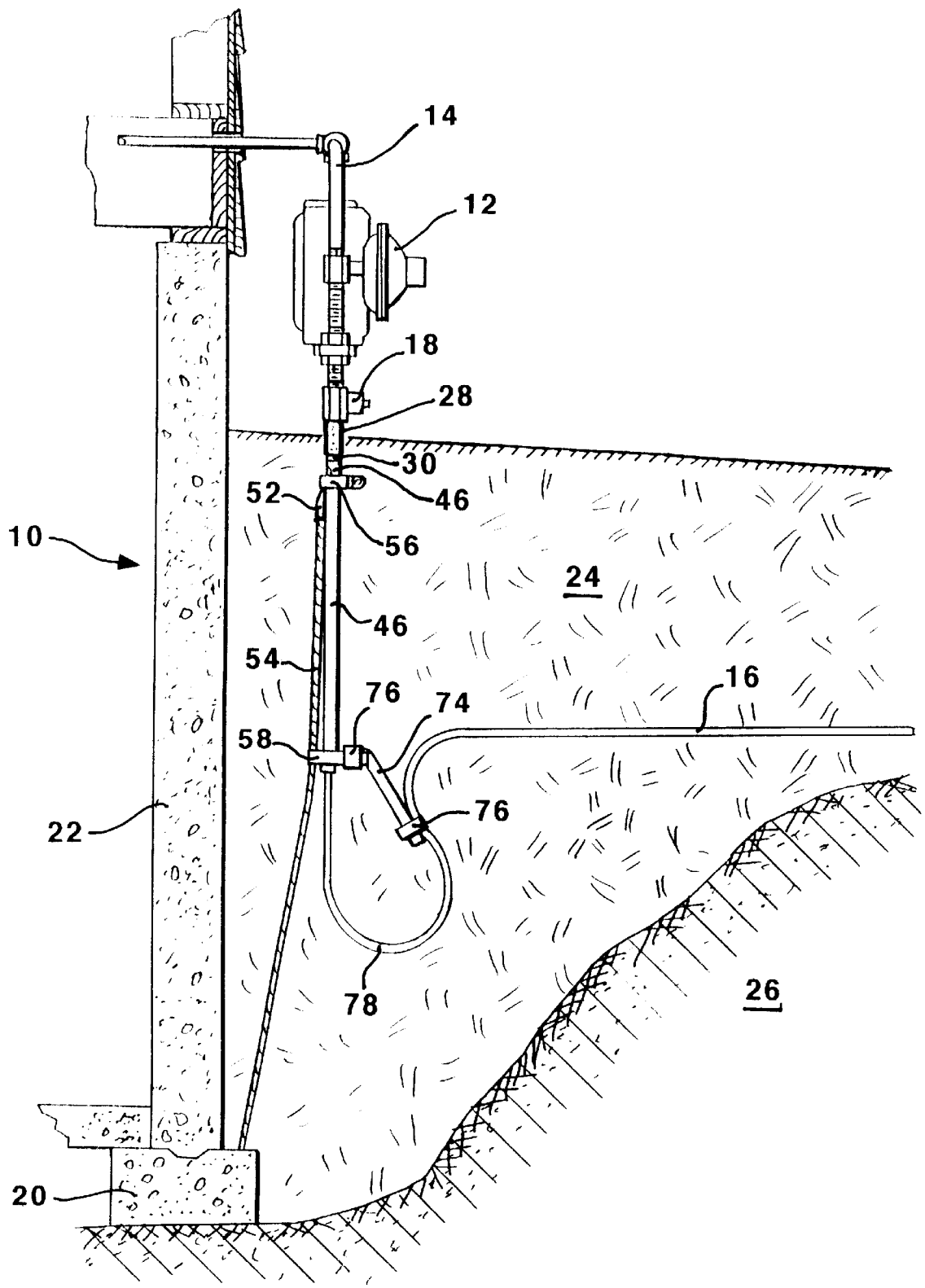
FIG. 1 is an schematic elevational view of a gas line meter stabilizer according to the present invention showed in operative relation with a conventional building foundation wall shown in cross-section.

A preferred embodiment of a gas line meter stabilizer apparatus 10 is shown in FIG. 1. Conventionally, gas is supplied to a building through a plastic gas supply line 16 which is connected through a gas meter 12 to the building supply pipe 14.

A widely used construction technique for erecting a building includes the digging of a trench in which a footer 20 is poured. A foundation wall 22 is then erected on top of footer 20. Because footer 20 is poured in a trench, fill dirt 24 is back filled between wall 22 and undisturbed soil 26 upon completion of the foundation work.

When a gas supply line is to be installed, the plastic gas supply 16 is conventionally connected to a metal pipe 28 through a transition fitting 30. The piping 28 is led through shut-off valve 18 and then to meter 12. From meter 12, the gas supply line is led through a wall of the building to the inside of the building.

Figure 2:
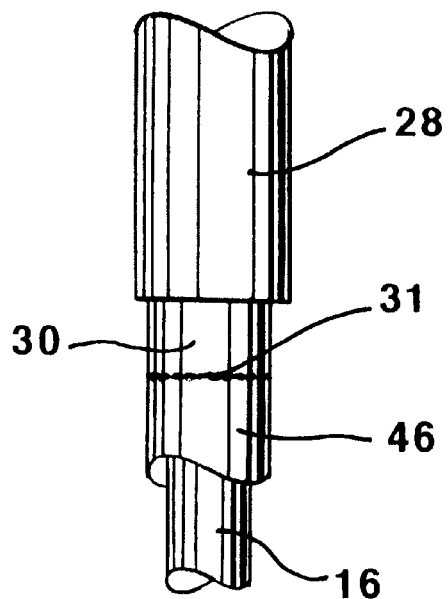
FIG. 2 is an elevational view showing the transition between a protective sleeve and the above ground metal gas line pipe according to the present invention.

As shown in FIG. 2 a protective sleeve 46 is fitted in surrounding relation to line 16 and is secured at one end to fitting 30 as by welding at 31. In a preferred embodiment protective sleeve 46 is made of stainless steel.

Figure 4:
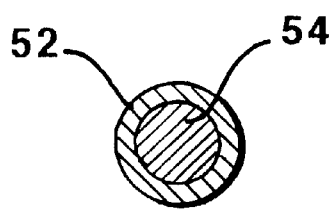
FIG. 4 is an cross-sectional view taken along the line 4—4 in FIG. 3.
Figure 3:
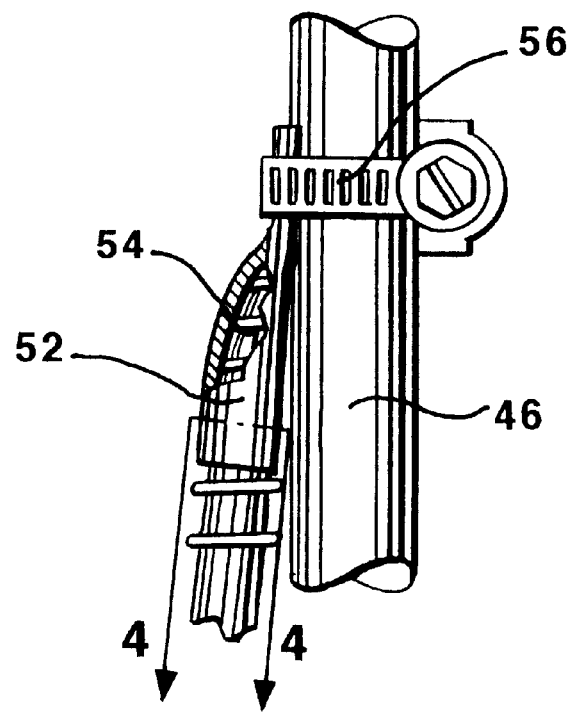
FIG. 3 is an elevational view, with parts broken away, of a rod socket connected to a protective sleeve according to the present invention.

Plastic gas supply line 16 is led through protective sleeve 46 and conventionally connected (not shown) to piping 28 through fitting 30. As shown if FIG. 1, a support rod 54 is provided having one end positioned against and lying on top of footer 20. The upper end of support rod 54 is secured to protective sleeve 46 with rod socket 52 as shown in FIG. 4 which is sized to accept an end of support rod 54. Support rod socket 52 is securely clamped to protective sleeve 46 by pipe clamp 56, which in a preferred embodiment is a conventional worm-gear pipe clamp.

Figure 7:
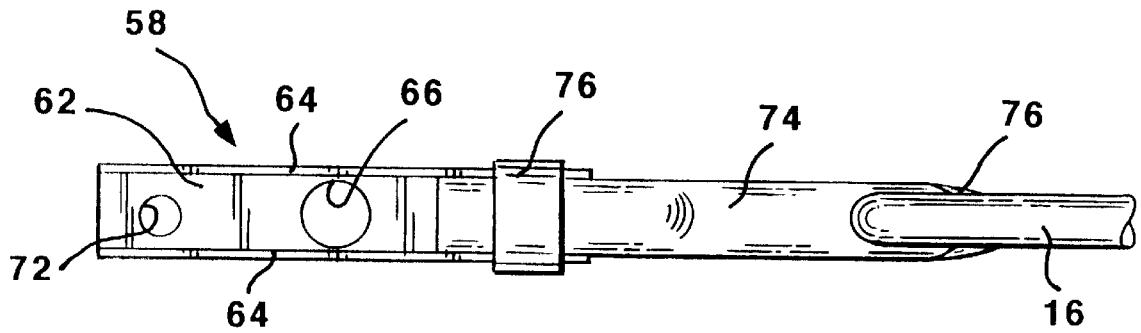
FIG. 7 is a top plan view of the pipe support fixture as shown in FIG. 5 with parts removed.
Figure 5:
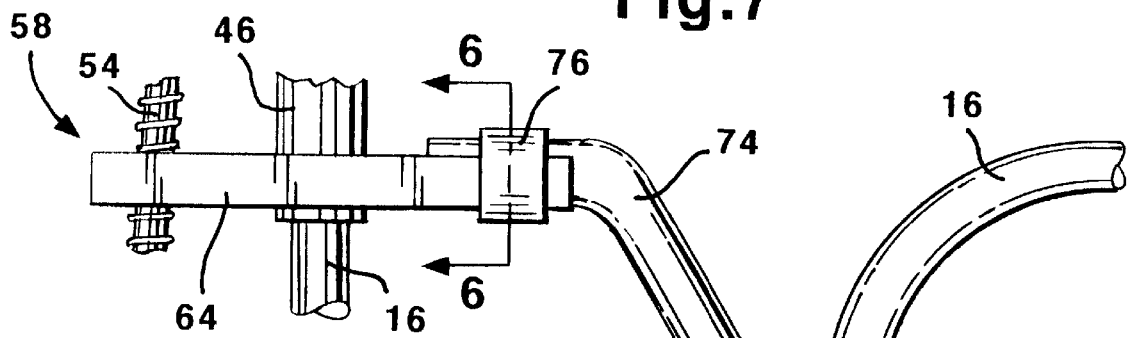
FIG. 5 is an elevational view with parts broken away, of a pipe support fixture according to the present invention.
Figure 6:
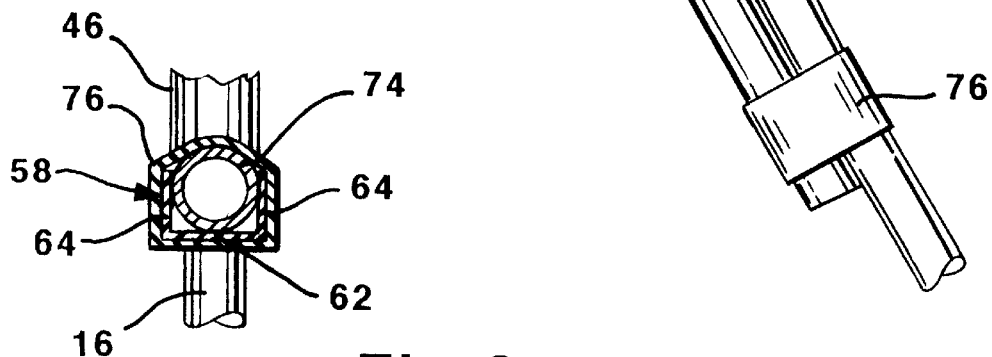
FIG. 6 is an cross-sectional view taken along the line 6—6 in FIG. 5.
Figure 8:
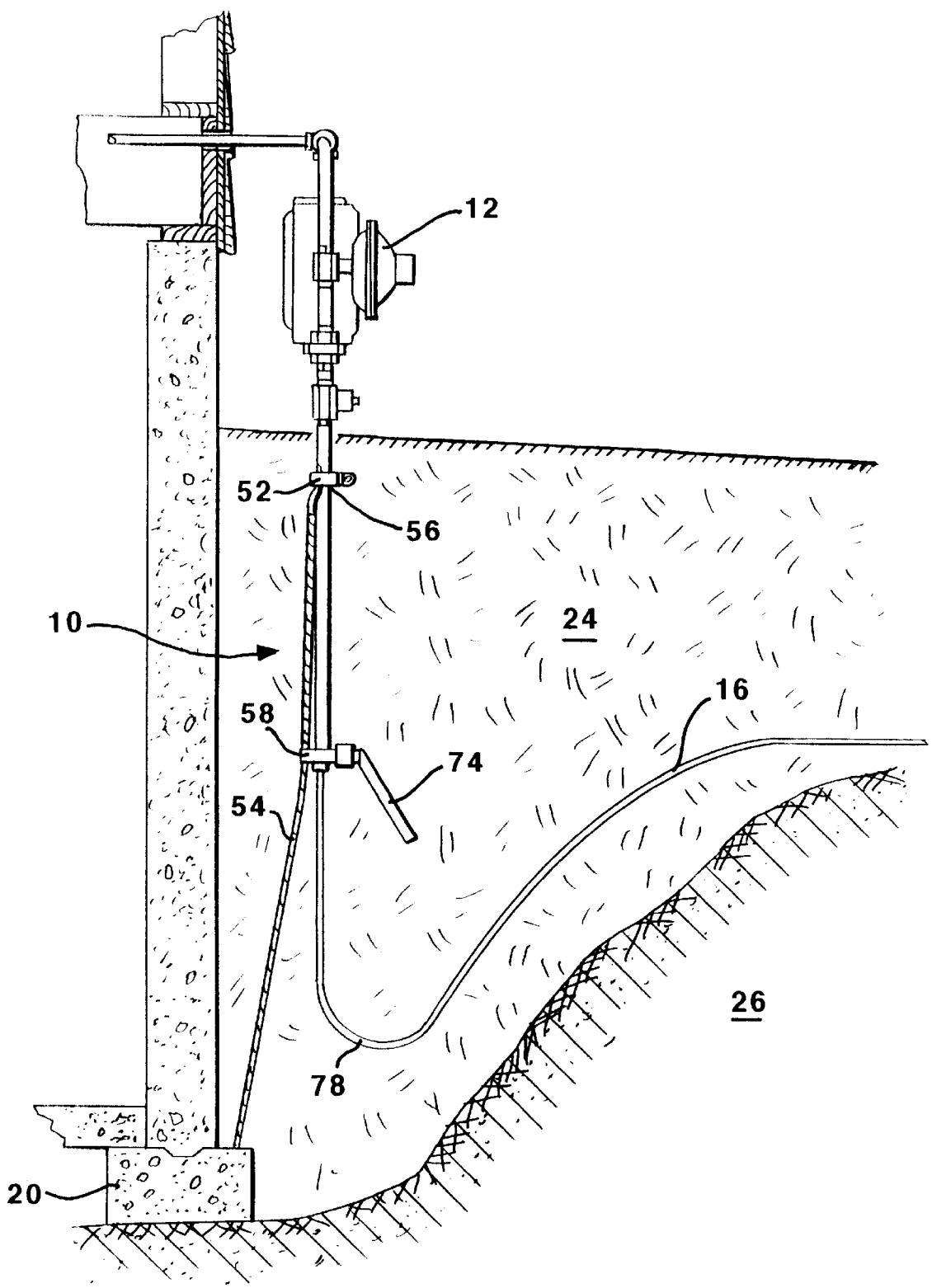
FIG. 8 is a schematic elevational view of a gas line meter stabilizer of the present invention as it appears after fill dirt has settled.

A pipe support fixture 58 is secured to the bottom end of protective sleeve 46 as shown in FIG. 1. The fixture 58 in a preferred embodiment is a squared "U" channel member having a web portion 62 extending between parallel upright sidewalls 64. A hole 66 is drilled in the web portion 62 and is sized to accept protective sleeve 46. A hole 72 is drilled through web portion 62 and is sized to receive rod 54 as shown in FIGS. 5 and 7. In a preferred embodiment the pipe support fixture 58 is constructed of metal and is secured to protective sleeve 46 as by welding.

As best seen in FIG. 5, a tubular support 74 is positioned on web 62 between walls 64 as shown in FIGS. 5 and 7. Biodegradable tape 76 is wrapped around a tubular support 74 and the support fixture 58 to secure tubular support 74 in this position. The tubular support 74 is bent as shown in FIG. 5. The plastic line 16 is positioned to have a slack loop 78 as shown in FIG. 1 and a portion of the slack loop is secured to the tubular support 74 with biodegradable tape 76 wrapped around both piping 16 and tubular support 74 to hold the two together.

In a preferred embodiment, biodegradable tape 76 is used to hold the line 16 to pipe support fixture 58 although any other type of break-away connection could also be used. When using biodegradable tape, the tape degrades with time allowing line 16 to break away from pipe support fixture 58.

With the present invention, the gas line 16 may be positioned in a trench during the construction of a building. A slack loop is formed in the gas line pipe and positioned against support 74. Tape or another break-away connector is used to temporarily hold line 16 against support 74 until dirt is back filled. Then as the fill dirt settles with time, line 16 will break-away from pipe support fixture 58. The loop of line 16 will accommodate the settling of line 16 in the fill dirt eliminating the tension on line 16 pulling on meter 12. Further, rod 54 resting on footer 20 which is secured to protective sleeve 46 positively supports meter 12 so that as gas line 16 moves downwardly, the meter 12 will not move with the gas line.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A stabilizer for a gas line meter located above a ground surface of dirt and connected to a flexible gas supply line extending beneath the ground surface adjacent a foundation wall joined to a building footer located beneath the ground surface comprising:

a rigid protective sleeve surrounding the gas supply line and extending in a generally vertical direction beneath the ground surface and adjacent the foundation wall; and a support rod also extending in a generally vertical direction adjacent the foundation wall having first and second ends with the first end resting on top of the footer beneath the ground surface and the second end secured to the protective sleeve at an upper end thereof;

whereby when the gas supply line settles downwardly with the dirt, the gas meter is not pulled downwardly with the gas supply line.

2. The stabilizer according to claim 1, further including a pipe holder secured to the protective sleeve at a lower end thereof and a break-away connector for connecting the pipe holder to a portion of a slack loop of the flexible supply line.

3. The stabilizer according to claim 2 wherein the break-away connector comprises biodegradable tape.

* * * * *